US009475522B2

United States Patent
Van Meijl et al.

(10) Patent No.: US 9,475,522 B2
(45) Date of Patent: Oct. 25, 2016

(54) VEHICLE, METHOD FOR MOVING SUCH A VEHICLE, AND TRANSPORT SYSTEM FOR OBJECTS SUCH AS ITEMS OF LUGGAGE

(71) Applicant: VANDERLANDE INDUSTRIES B.V., Veghel (NL)

(72) Inventors: Erik Wilhelmus Petronella Van Meijl, Eindhoven (NL); Jozef Antonius Wilhelmus Maria Van Eekelen, Eindhoven (NL); Aart Jan De Graaf, Bodegraven (NL)

(73) Assignee: VANDERLANDE INDUSTRIES B.V., Veghel (NL)

( * ) Notice: Subject to any disclaimer, the term of this patent is extended or adjusted under 35 U.S.C. 154(b) by 0 days.

(21) Appl. No.: 14/902,712

(22) PCT Filed: Jul. 7, 2014

(86) PCT No.: PCT/NL2014/050450
§ 371 (c)(1),
(2) Date: Jan. 4, 2016

(87) PCT Pub. No.: WO2015/002539
PCT Pub. Date: Jan. 8, 2015

(65) Prior Publication Data
US 2016/0167706 A1   Jun. 16, 2016

(30) Foreign Application Priority Data

Jul. 5, 2013  (NL) ...................................... 2011113

(51) Int. Cl.
*A01B 69/00* (2006.01)
*B62D 11/00* (2006.01)
(Continued)

(52) U.S. Cl.
CPC ............ *B62D 11/003* (2013.01); *B60W 10/08* (2013.01); *B60W 10/20* (2013.01); *B60W 30/18* (2013.01);
(Continued)

(58) Field of Classification Search
CPC ....... B62D 11/003; B62D 11/02; B64F 1/32; B60W 10/20; B60W 10/08; B60W 30/18
USPC ......... 701/41; 180/6.32, 6.48, 6.5, 8.2, 9.46, 180/907
See application file for complete search history.

(56) References Cited

U.S. PATENT DOCUMENTS 4,579,181 A   4/1986   Jarret et al.
5,456,332 A * 10/1995   Borenstein ........... B60K 17/358
                                                    180/167

(Continued)

FOREIGN PATENT DOCUMENTS

DE   102007034206 A1   1/2009
DE   102010007014 A1   8/2011

(Continued)

OTHER PUBLICATIONS

International Search Report PCT/NL2014/050450 dated Jul. 8, 2014.

*Primary Examiner* — Thomas G Black
*Assistant Examiner* — Luke Huynh
(74) *Attorney, Agent, or Firm* — Shumaker, Loop & Kendrick, LLP

(57) ABSTRACT

A method and an automatically controlled vehicle for transporting an object such as an item of luggage, with two pivotable axles each having at the outer ends two wheels driven with drive motors, with a control unit which is configured to perform the steps of controlling each of the drive motors such that an at least substantially equal basic drive torque is applied to each of the wheels and, for the purpose of changing the direction of the vehicle, controlling the drive motors associated with a wheel support arm such that a steering torque which is of the same magnitude but of opposite direction is applied in addition to the basic drive torque to the associated wheels.

10 Claims, 4 Drawing Sheets

(51) Int. Cl.
  *B62D 11/04* (2006.01)
  *B62D 11/20* (2006.01)
  *B64F 1/32* (2006.01)
  *B64F 1/36* (2006.01)
  *G05D 1/02* (2006.01)
  *B60W 10/08* (2006.01)
  *B60W 10/20* (2006.01)
  *B60W 30/18* (2012.01)
  *B62D 11/02* (2006.01)

(52) U.S. Cl.
  CPC ............... *B62D 11/02* (2013.01); *B62D 11/04* (2013.01); *B62D 11/20* (2013.01); *B64F 1/32* (2013.01); *B64F 1/368* (2013.01); *G05D 1/0297* (2013.01); *B60W 2710/08* (2013.01); *B60W 2710/202* (2013.01); *G05D 2201/0216* (2013.01)

(56) References Cited

U.S. PATENT DOCUMENTS

| | | | |
|---|---|---|---|
| 5,482,125 A * | 1/1996 | Pagett | A61G 5/042 180/6.32 |
| 2006/0266565 A1 | 11/2006 | Fontecchio et al. | |
| 2009/0143940 A1 | 6/2009 | Rhodes et al. | |
| 2011/0307129 A1* | 12/2011 | Yu | B60K 7/0007 701/22 |
| 2014/0145498 A1* | 5/2014 | Yamakado | B60T 8/1755 303/3 |

FOREIGN PATENT DOCUMENTS

| | | |
|---|---|---|
| EP | 0315210 A1 | 5/1989 |
| EP | 0770533 A1 | 5/1997 |
| EP | 0945327 A2 | 9/1999 |
| EP | 0945327 A3 | 9/1999 |
| EP | 1112913 A1 | 7/2001 |
| EP | 1247713 A2 | 10/2002 |
| EP | 1247713 A3 | 10/2002 |

* cited by examiner

VEHICLE, METHOD FOR MOVING SUCH A VEHICLE, AND TRANSPORT SYSTEM FOR OBJECTS SUCH AS ITEMS OF LUGGAGE

The present invention relates to an automatically controlled vehicle for transporting an object such as an item of luggage or goods similar thereto such as a parcel, the vehicle comprising a chassis having on an upper side a carrying surface for the object, a first wheel support arm connected to the chassis for pivoting about a first pivot axis and having respectively a left and right first wheel at the opposite outer ends thereof, a second wheel support arm connected to the chassis for pivoting about a second pivot axis located at a distance from the first pivot axis and having respectively a left and right second wheel at the opposite outer ends thereof, per wheel an electric drive motor connected thereto for driving the relevant wheel, a control unit for separate control of each of the drive motors, a source of electrical energy such as a battery which is connected to each of the drive motors and to the control unit.

The present invention further relates to a method for moving such a vehicle and to a system comprising a number of such vehicles.

U.S. Pat. No. 5,456,332 discloses a known vehicle with two wheel modules, each with two wheels driven independently by respective electric motors. The wheel modules can each pivot about a respective vertical pivot axis relative to the chassis of the vehicle. One of the wheel modules can translate relative to the chassis. The rotation speed of each of the wheels is controlled individually by a control unit. Control errors, i.e. deviations, are compensated by translation as a whole of said one of the wheel modules.

A drawback of said known vehicle is that it has a complex construction, and further that the algorithm programmed into the control unit is complex and error-susceptible.

BRIEF SUMMARY OF THE INVENTION

An object of the present invention is therefore to provide a vehicle for transporting an object such as an item of luggage or goods similar thereto such as a parcel, with a simpler construction and with a less complex and more robust control algorithm.

Said object is achieved with the vehicle according to the present invention which is characterized in that its control unit is configured to perform the steps of:

a) controlling each of the drive motors subject to a predetermined vehicle speed such that an at least substantially equal basic drive torque is applied to each of the wheels, and b) for the purpose of changing an angular position of at least one wheel support arm relative to the chassis for changing the direction of the vehicle, controlling the drive motors associated with said at least one wheel support arm such that a steering torque which is of the same magnitude but of opposite direction is applied in addition to the basic drive torque to the wheels associated with said respective drive motors.

An advantage of the vehicle according to the present invention is that, by separating the function of controlling the speed of the vehicle and of controlling the direction of, or steering, the vehicle, the control unit can be given a considerably simpler form. Use can more specifically now be made of a control unit with an SISO (single input single output) control algorithm for controlling the speed and a separate SISO control algorithm for controlling the angular position of a respective wheel support arm. Torque-dependent control of the wheels moreover makes the control unit more robust, or not prone to error, and a wheel support arm provided translatably relative to the chassis as present in the vehicle according to U.S. Pat. No. 5,456,332 is no longer necessary, which can make the vehicle significantly simpler structurally. Owing to the active driving of each of the wheels individually, particularly the torque-dependent control, the vehicle according to the invention is highly dynamic and thereby extremely suitable for rapid and reliable transport of objects such as items of luggage which lie loosely on the object carrying surface, and the variable loads associated therewith, also for instance when passing through bends and during rapid acceleration and braking.

In the context of the invention an automatically controllable vehicle is understood to mean a vehicle which, at a command from a central control unit which is not provided on the vehicle but for instance in or close to a space in which the vehicle travels over a ground surface, can travel independently over a ground surface and can for instance cover a path imposed by the central control unit while using a local control unit on the vehicle and a drive such as by electric drive motors which are connected to at least one wheel.

Although the invention relates particularly to the transport of objects such as items of luggage or similar goods such as parcels placed directly onto the carrying surface of the vehicle, also included within the context of the invention is transport with the vehicle of objects such as items of luggage received in a carrying tray such as a luggage tub, wherein a carrying tray with an object therein is thus placed on the carrying surface of the vehicle for the purpose of transport of the object by the vehicle.

The first and second pivot axes extend mutually parallel and vertically, i.e. at least substantially perpendicularly of a plane defined by the wheel axles of the wheel, or at least substantially perpendicularly of a virtual plane through contact points of said wheels with a ground surface during operation of the vehicle. The second pivot axis is further located behind the first pivot axis as seen in longitudinal direction of the vehicle.

It is favourable for the vehicle to comprise for at least one wheel a wheel rotation sensor connected to the control unit for measuring a rotation of the relevant wheel for determining an actual vehicle speed for the purpose of step a) while using the wheel rotation sensor.

It is further favourable for the vehicle to further comprise, for at least one of the first and the second wheel support arm, a wheel rotation sensor connected to the control unit for each wheel associated with said wheel support arm for the purpose of measuring a rotation of the relevant wheel, wherein the control unit is further configured, for the purpose of step a), to:

a1) determine an actual speed of the wheel support arm at the position of the pivot axis thereof by determining an average from output signals coming from the two wheel rotation sensors associated with the wheels associated with said wheel support arm, and a2) determine an actual vehicle speed on the basis of said actual speed of the wheel support arm and to compare the actual vehicle speed to a predetermined vehicle speed so as to determine a speed deviation, and to change the basic drive torque of each of the wheels of the vehicle in equal measure depending on the speed deviation.

It is advantageous here for the vehicle to comprise for both the first and the second wheel support arm a wheel rotation sensor connected to the control unit for each wheel associated with the respective wheel support arm for the purpose of measuring a rotation of the relevant wheel, wherein the control unit is further configured, for the purpose of step a1), to:

determine an actual speed of both the first wheel support arm and the second wheel support arm, wherein during step a2) the actual vehicle speed is determined by determining an average, preferably the quadratic average, of the actual speed of the first and the second wheel support arms.

The vehicle preferably comprises, for at least one of the first and the second wheel support arm, a rotation sensor connected to the control unit for determining a rotation of the relevant wheel support arm round the associated pivot axis relative to the chassis, wherein the control unit is further configured, for the purpose of step b), to:

b1) determine an actual angular position of the at least one wheel support arm on the basis of an output signal from the rotation sensor associated with said wheel support arm, and b2) compare the actual angular position to a predetermined angular position of the relevant wheel support arm so as to determine an angular position deviation and, depending on the angular position deviation, to change in equal measure but in opposing direction the additional steering torque applied to the wheels associated with the relevant wheel support arm.

The vehicle here preferably comprises
- a first rotation sensor connected to the control unit for determining a rotation of the first wheel support arm round the first pivot axis relative to the chassis,
- a second rotation sensor connected to the control unit for determining a rotation of the second wheel support arm round the second pivot axis relative to the chassis.

The control unit is preferably further configured, for the purpose of step b2), to determine a predetermined angular position of the first wheel support arm and of the second wheel support arm on the basis of a predetermined change to be made in the direction of the vehicle such that the respective angular positions are at least substantially the same but in opposed directions.

The second pivot axis is quite preferably located at a fixed distance from the first pivot axis. By providing the two pivot axes at a fixed mutual distance, control algorithms of the control unit can also be executed more easily in respect thereof.

BRIEF DESCRIPTION OF THE DRAWINGS

The present invention will be elucidated hereinbelow on the basis of the description of a preferred embodiment of a vehicle and method according to the invention, in which.

DETAILED DESCRIPTION OF THE INVENTION

Figure 1:
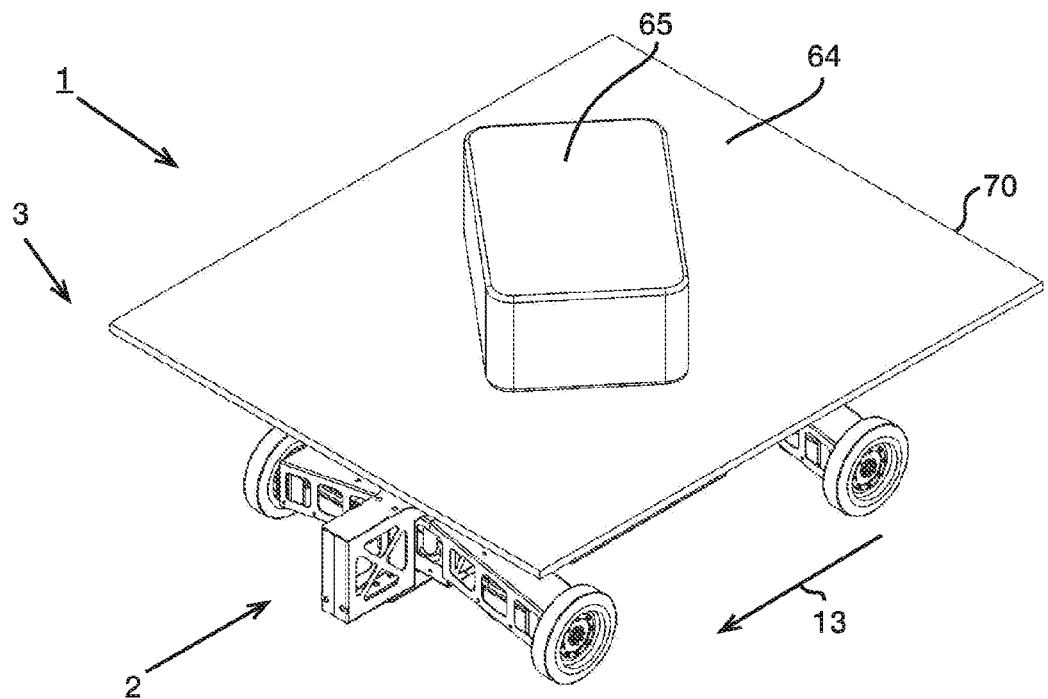
FIG. 1 is a three-dimensional view of a preferred embodiment of a vehicle according to the present invention.

FIG. 1 shows a vehicle 1 with a travelling part 2 and an object carrying part arranged on the travelling part 2 and formed by the luggage carrying part 3. The luggage carrying part 3 has a carrying surface 64 formed by an upper surface of a rectangular plate 70 for carrying one or more objects such as items of luggage 65 for the purpose of transporting the item/items of luggage 65 between a first and a second location.

The travelling part 2 comprises an elongate chassis beam 4 which extends in longitudinal direction 13 of the vehicle 1 and lies centrally as seen in transverse direction of the vehicle 1, and which substantially forms the chassis. See FIGS. 2 and 3. Provided close to a first outer end 5 of the chassis beam 4 is a first wheel support arm 6 which, at least in a neutral position of the wheel support arm 6, extends transversely of the chassis beam 4 and through the chassis beam 4. A respective first wheel 7 rotatable around a wheel axle is provided at both opposite outer ends of the first wheel support arm 6. The first wheel support arm 6 is connected centrally between the two wheels 7 to the chassis beam 4 for pivoting about a first pivot axis 8. The first pivot axis 8 extends vertically. The first pivot axis 8 further intersects the wheel axles of both first wheels 7, which wheel axles are mutually coaxial. Provided close to a second outer end 12 of the chassis beam 4 opposite the first outer end 5 is a second wheel support arm 9 which, at least in a neutral position of the wheel support arm 9, extends transversely of the chassis beam 4 and through the chassis beam 4 similarly to the first wheel support arm 6. A respective second wheel 10 rotatable around a wheel axle is provided at both opposite outer ends of the second wheel support arm 9. The second wheel support arm 9 is connected centrally between the two wheels 10 to the chassis beam 4 for pivoting about a second pivot axis 11. The second pivot axis 11 likewise extends vertically, parallel to the first pivot axis 8. The second pivot axis 11 further intersects the wheel axles of both second wheels 10, which wheel axles are mutually coaxial. As shown particularly in FIG. 3 and FIG. 4, the described construction of the travelling part 2 of the vehicle 1 is substantially symmetrical as seen in both longitudinal direction 13 and transverse direction of the vehicle 1.

Figure 4:
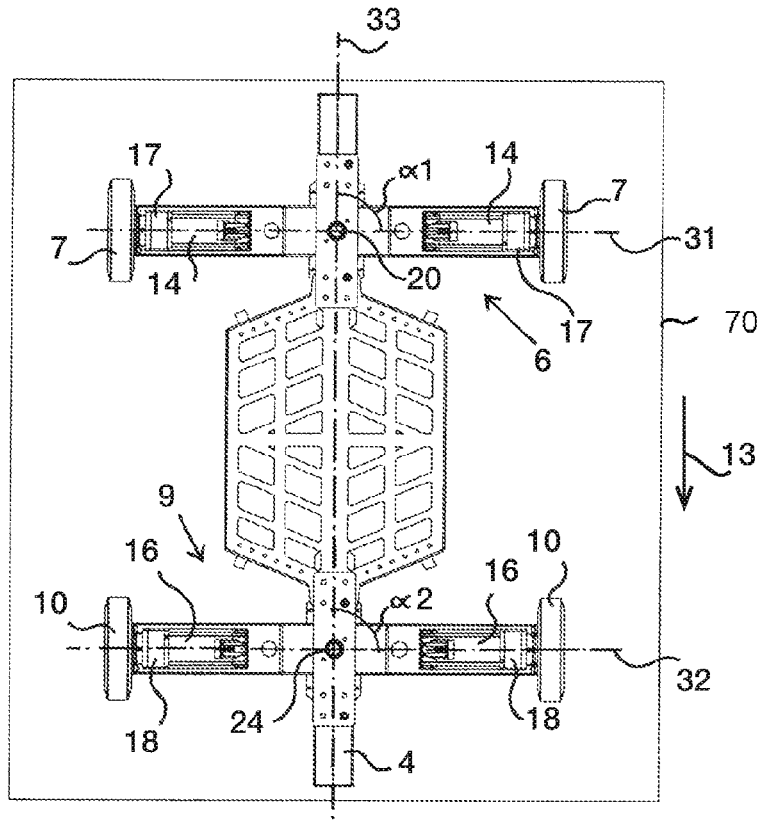
FIG. 4 is a bottom view of the vehicle according to FIG. 1.

As shown particularly in FIG. 4, each of the wheels 7 has its own electric motor 14 which is connected thereto via a reducing gear and which is mounted on the first wheel support arm 6, and each of the wheels 10 similarly has its own electric motor 16 which is connected thereto via a reducing gear and which is mounted on the second wheel support arm 9. A respective first rotation sensor 17 is moreover connected to each of the wheels 7 for measuring rotation of the associated wheel 7 round the wheel axle. A respective second rotation sensor 18 is connected to each of the wheels 10 for measuring rotation of the associated wheel 10 round the wheel axle. Said rotation sensors 17, 18 are incremental encoders.

The first pivot axis 8 forms the central axis of a first shaft body 20 arranged in the first wheel support arm 6. The shaft body 20 is connected via bearings to the chassis beam 4 in a passage 21 in the chassis beam 4. In order to measure rotation of the first wheel support arm 6 round the first pivot axis 8 relative to the chassis beam 4, i.e. the angular position of the first wheel support arm 6, a first rotation sensor 22 is arranged which is connected on the one hand to the first shaft body 20 and on the other to the chassis beam 4. The first rotation sensor 20 is an absolute encoder. Said angular position is more specifically an angle $\alpha 1$ between the longitudinal axis 31 of the first wheel support arm 6, which longitudinal axis 31 runs coaxially to the wheel axles, and the centrally located longitudinal axis 33 of the chassis beam 4. See also FIG. 5. The longitudinal axis 33 of the chassis beam 4 is defined as a line lying perpendicularly of the first and second pivot axes 8, 11 and intersecting both these pivot axes 8, 11. The longitudinal axis 33 is parallel to the lengthwise direction 13 of the vehicle. The second wheel support arm 9 has the same construction, i.e. has a second shaft body 24 which is coaxial to the first pivot axis 11. A second rotation sensor 25 is operative between the chassis beam 4 and the second wheel support arm 9 for the purpose of measuring the angular position α2 of the second wheel support arm 9 relative to the chassis beam 4, i.e. an angle α2 between the longitudinal axis 32 of the second wheel support arm 9 and the longitudinal axis 33 of the chassis beam 4.

Both the first wheel support arm 6 and the second wheel support arm 9 can pivot freely around respectively the first and second pivot axis 8, 11, i.e. apart from the bearing there are further no elements generating a resetting force to the neutral position of the associated wheel support arm 6, 9. In the context of the invention the neutral position is understood to mean the position of the wheel support arms in which the vehicle 1 moves straight ahead, in line with the longitudinal direction 13 thereof. That is, the wheel support arms 6, 9 extend at right angles to the chassis beam 4. Because said pivot axes 8, 11 extend vertically, no resetting effect is brought about due to the orientation thereof. In order to prevent an undesirably large angular position α1, α2 of a wheel support arm 6, 9 end stops 29 are arranged on a central widened portion 28 of the vehicle 1.

The central portion 28 further functions for the purpose of carrying equipment such as a control unit 73 which is connected to the motors 14, 16 and all the above stated rotation sensors 17, 18, 22, 25. Also placed on the central portion 28 is a source of electrical energy in the form of a battery 74, which battery is at least connected to each of the drive motors 14, 16 and to the control unit 73. The vehicle 1 also comprises for each drive motor 14, 16 a separate frequency controller, not shown in the figures, for converting a control signal from the control unit 73 to a current and voltage for the drive motor 14, 16 connected to the associated frequency controller.

Figure 2:
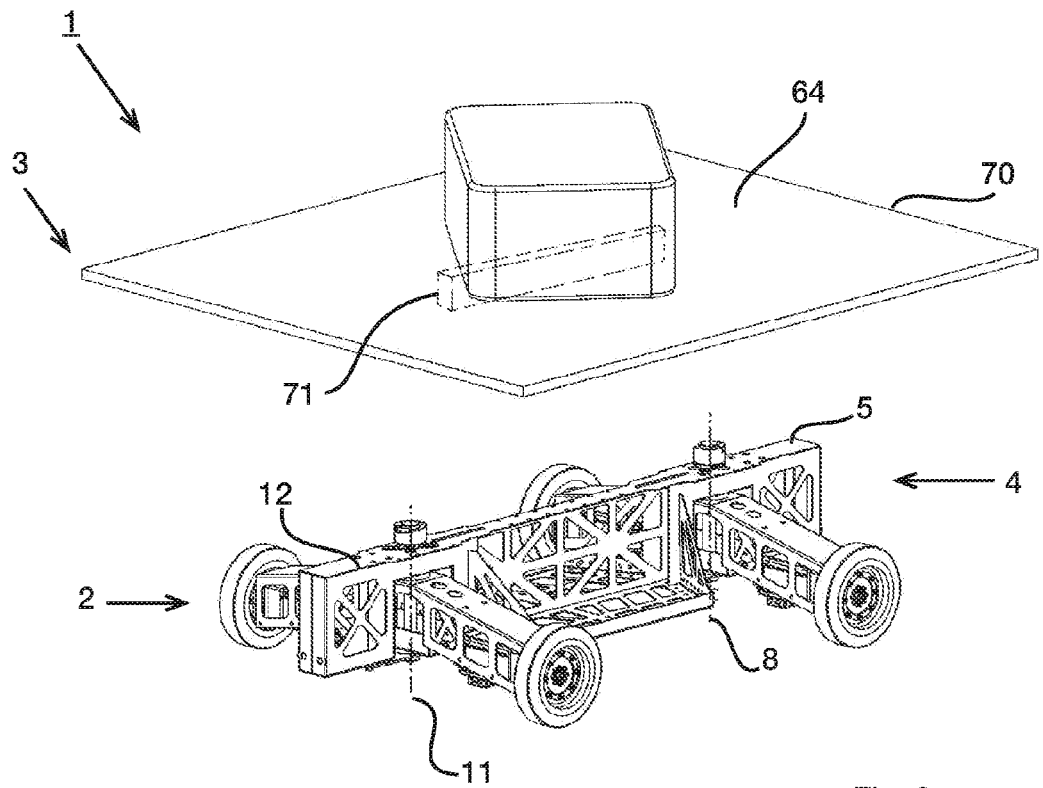
FIG. 2 is an exploded view of the vehicle according to FIG. 1.
Figure 3:
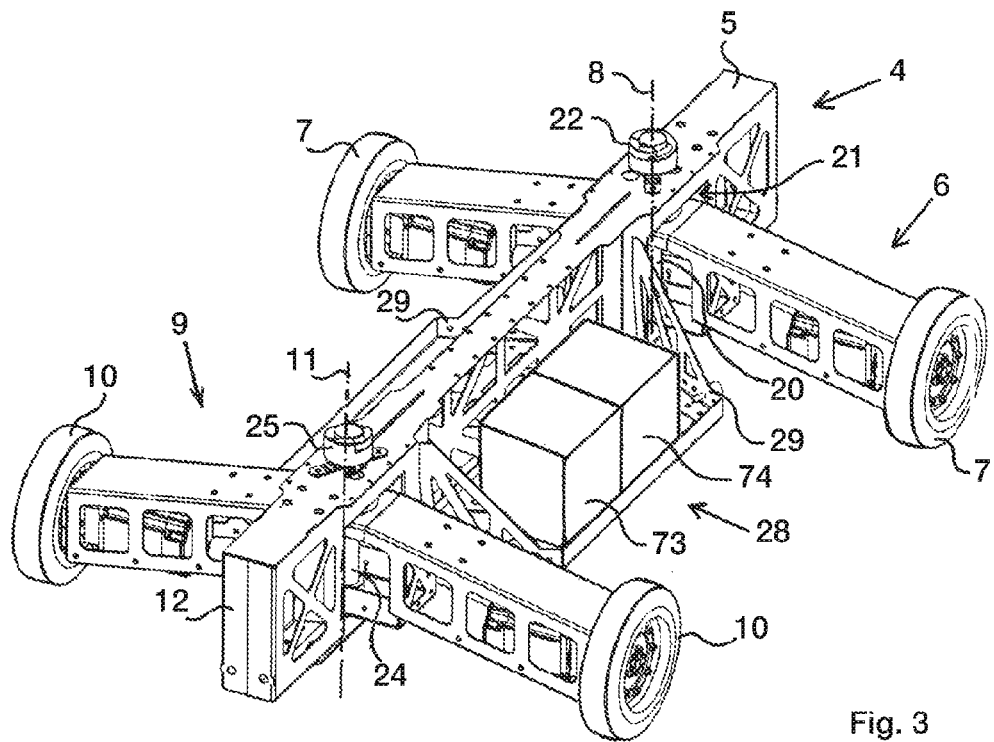
FIG. 3 is a three-dimensional view of a travelling part of the vehicle according to FIG. 1.

As shown particularly in FIG. 2, the plate 70 is mounted via a coupling piece 71 on the chassis beam 4. The coupling piece 71 is beam-like and extends through a vertical height such that a lower surface of the plate 70 is situated a little above the sensors 22, 25. The coupling piece 71 is attached with a screw fastening to the underside of the plate 70 and connected with a screw fastening to the top of a middle part of the chassis beam 4 between the two shaft bodies 20 and 24.

The control unit 73 has a processor and memory element 96. Using the processor the operations or steps to be specified below can be performed by means of a control algorithm for performing said steps which is stored in the memory element. The control unit 73 can further comprise transmission means, such as in the form of a (schematically shown) transmitting and receiving module 91 for wireless communication 92 with a (schematically shown) transmitting and receiving module 94 of a (schematically shown) central control unit 93 of a transport system for objects such as items of luggage or similar goods such as for instance parcels comprising a number of the above described vehicles, usually several tens to several hundreds, which can each communicate wirelessly with the central control unit. At a command from the central control unit the vehicle can be controlled here such that it travels for instance independently along a predetermined route from a first location to a second for the purpose of transporting one (or more) object(s) between said locations.

For the purpose of moving the vehicle the control unit is configured for torque-dependent control of each of the drive motors of the wheels by using the algorithm such that the vehicle maintains a predetermined speed. The control unit is more specifically configured to control each of the drive motors equally with the algorithm subject to a predetermined vehicle speed such that an at least substantially equal basic drive torque is applied to all wheels associated with the respective drive motors. The predetermined vehicle speed can for instance be a speed profile of the vehicle speed along a route to be covered by the vehicle. The speed profile can be stored or loaded in the memory of the control unit, preferably in dynamically modifiable manner, for instance resulting from mutual communication or data exchange between the control unit of the vehicle and the central control unit of a transport system of which the vehicle forms part.

For the purpose of said movement of the vehicle the control unit 73 is further configured to determine, making use of the algorithm, an actual speed of a wheel support arm at the position of the pivot axis of this wheel support arm, wherein the speed is defined as a direction relative to the longitudinal direction of the associated wheel support arm and as a magnitude of the speed. This speed is determined by converting output signals coming from the two wheel rotation sensors associated with the wheels associated with this wheel support arm to a respective wheel speed and by determining an average hereof. Because the pivot axis of each of the wheel support arms lies centrally between the associated respective wheels and the wheel support arm is also connected to the chassis at this location, the calculated actual speed of the wheel support arm is therefore also the speed of the vehicle at the position of the associated pivot axis.

In an embodiment of the method an actual vehicle speed can then be determined by determining a quadratic average, or effective value, of the actual speed of the first and the second wheel support arm. The actual wheel speed is alternatively determined by the actual speed of one of the first and the second wheel support arm.

The determined actual vehicle speed is subsequently compared to the predetermined vehicle speed in order to determine a speed deviation, and with a speed controller S the basic drive torque $T_s$ of each of the wheels of the vehicle is changed in equal measure subject to the speed deviation.

Figure 6:
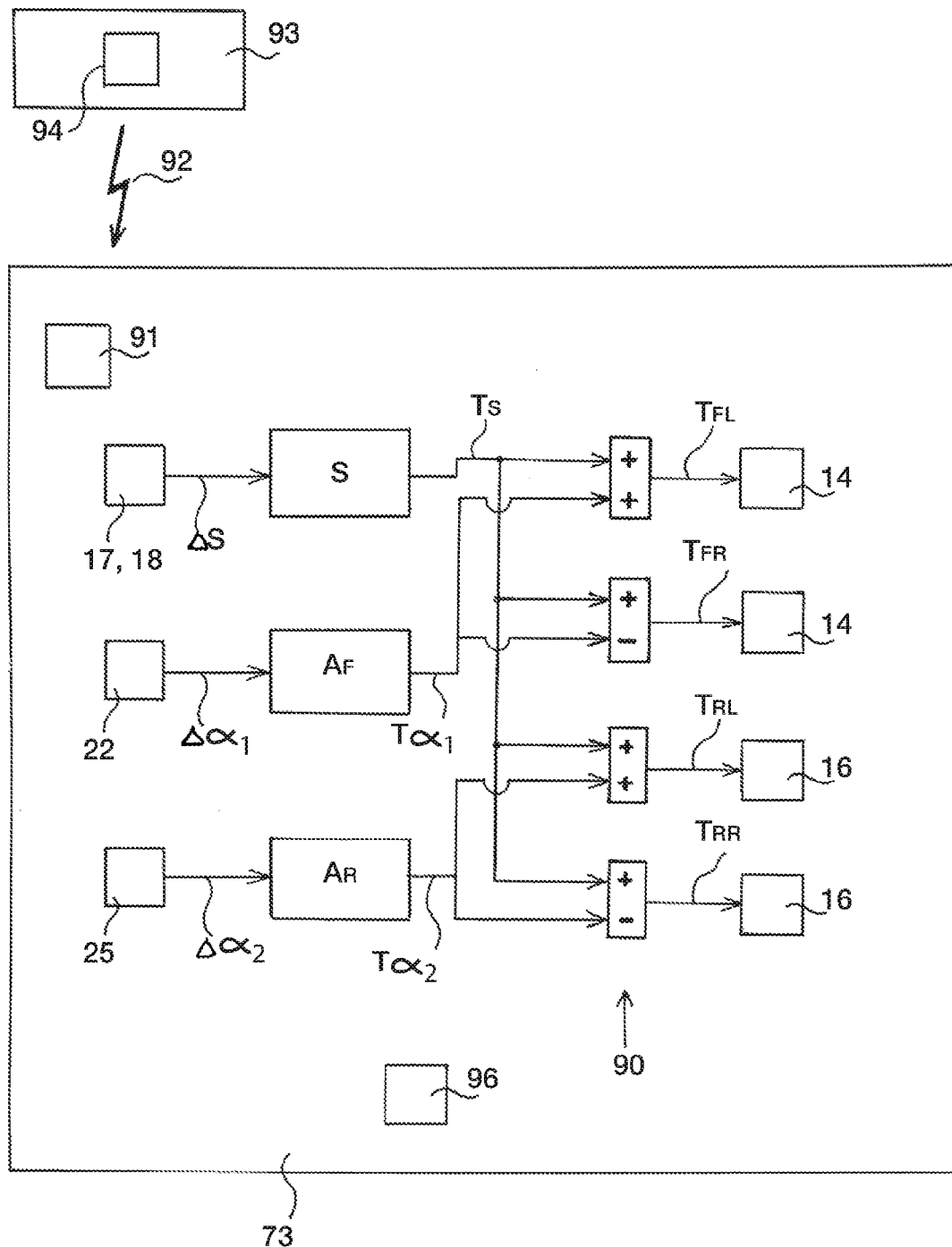
FIG. 6 shows schematically an exemplary embodiment of a control unit 73 of a vehicle according to the invention.

FIG. 6 shows a diagram of the control algorithm of the control unit 73. A first SISO controller S has as input a signal Δs representing a speed, such as a precalculated speed deviation from signals of encoders 17, 18 and a predetermined vehicle speed (not shown) as reference, and has as output $T_s$.

The control unit 73 is further configured, for the purpose of changing an angular position of the wheel support arm relative to the chassis for changing the direction of the vehicle, to control the drive motors associated with this wheel support arm such that an additional steering torque, which is of the same magnitude but of opposite direction, is applied to the wheels associated with the respective drive motors. The overall torque acting on a wheel is therefore the sum of the basic drive torque and the steering torque. A predetermined angular position, or an angular position profile of the angular position along the route, of a wheel support arm can be determined on the basis of information about the route to be covered. Such a profile can be stored or loaded in the memory of the control unit, for instance as a result of mutual data exchange between the control unit of the vehicle and the central control unit.

As shown in FIG. 6, the algorithm of the control unit comprises a separate steering angle controller $A_F$, $A_R$ for the respective first and second wheel support arm. $A_F$ has as input a signal representing an angle $\Delta\alpha_1$ such as an angular deviation calculated from signals from encoder 22 and a predetermined desired reference angle (not shown), and has as output a steering torque $T_{\alpha 1}$ for the drive motors of the first wheel support arm 6. The same applies similarly for the steering angle controller $A_R$ for the second wheel support arm with signal $\Delta\alpha_2$ as input. As shown in FIG. 6, the algorithm comprises per drive motor 14, 16 a counter 90 which for a left-hand drive motor 14 adds $T_{\alpha 1}$ to $T_s$ in order to obtain the overall torque $T_{FL}$ applied to the left-hand drive motor 14, and for the right-hand drive motor 14 subtracts $T_{\alpha 1}$ from $T_s$ in order to obtain the total torque $T_{FR}$ applied to the right-hand drive motor 14. The same applies similarly for the second wheel support arm, wherein using the said counters 90 an overall torque $T_{RL}$ for the left rear wheel and an overall torque $T_{RR}$ for the right rear wheel is obtained. The reference to left and right is understood here to mean the position of the relevant wheels/drive motors on the vehicle is seen in top view.

In an embodiment the control unit 73 comprises a location determining algorithm for determining the location of the vehicle on the ground surface over which the vehicle moves, or the location of the vehicle in the space in which it is situated. Information about the space can be stored or loaded for this purpose in the memory of the control unit, for instance in the form of a map with information about for instance delimitations of the space such as walls, obstacles in the space such as pillars, and optionally about orientation elements arranged fixedly in the space, such as for instance magnets in the ground. A vehicle position can be determined by the control unit on the basis of signals from wheel rotation sensors and optionally also from wheel support arm rotation sensors. The vehicle position can be compared to a predetermined vehicle position which follows from the route to be covered by the vehicle, which route can be stored linked to the map in the memory. A deviation in the position of the vehicle, i.e. a difference between the determined vehicle position and the predetermined vehicle position, for instance at the position of a pivot axis, can then be converted to a change in the predetermined angular position of the wheel support arm about this pivot axis such that the position deviation is reduced.

The control unit can be configured, periodically or depending on the location of the vehicle, to compare the determined vehicle position to actual vehicle position information, obtained from for instance the detection of an orientation element such as a magnet by a detection element, for periodic correction of the determined vehicle position on the basis of the actual position of the vehicle in the space. In this respect the detection element can alternatively be configured to scan an area of the space, for instance on the basis of laser beams, for the purpose of determining the actual position of the vehicle in the space.

In order to change the direction of the vehicle the control unit is further configured in an embodiment to determine, on the basis of a predetermined change to be made in the direction of the vehicle, a predetermined angular position of the first wheel support arm and of the second wheel support arm such that the respective angular positions are at least substantially the same but in opposed directions as seen relative to the neutral position in which both angular positions are 90 degrees.

Figure 5:
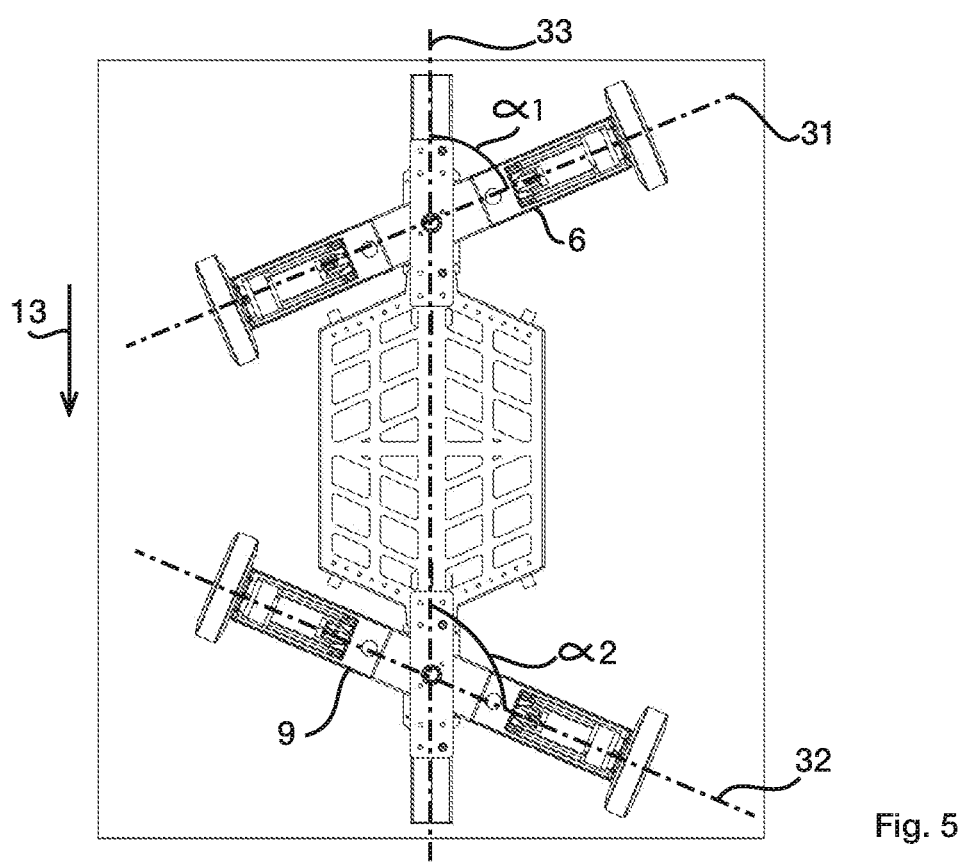
FIG. 5 is a bottom view of a portion of the vehicle according to FIG. 1 in another operative position compared to FIG. 4.

As shown in FIG. 4 and described above, the first and second wheel support arms 6, 9 in the neutral position are provided mutually parallel and at right angles to the chassis beam 4 during travel straight ahead. That is, the angles $\alpha 1$ and $\alpha 2$ are both 90 degrees. In FIG. 5 the position of the wheel support arms 6, 9 is shown when negotiating a bend. In this situation the wheels associated with each wheel support arm 6, 9 are driven such that the angular positions $\alpha 1$, $\alpha 2$ of the respective wheel support arms 6, 9 relative to the chassis are of the same magnitude but of opposite direction relative to the right-angled neutral position. In the example shown in FIG. 5 $\alpha 1$ is about 90−20=70 degrees, while $\alpha 2$ is about 90+20=110 degrees.

The invention claimed is:

1. An automatically controlled vehicle for transporting an object, the vehicle comprising:
    a chassis having on an upper side a carrying surface for the object,
    a first wheel support arm connected to the chassis for pivoting about a first pivot axis and having respectively a left and right first wheel at the opposite outer ends thereof,
    a second wheel support arm connected to the chassis for pivoting about a second pivot axis located at a distance from the first pivot axis and having respectively a left and right second wheel at the opposite outer ends thereof,
    per wheel an electric drive motor connected thereto for driving the relevant wheel,
    a control unit for separate control of each of the drive motors, and
    a source of electrical energy connected to each of the drive motors and to the control unit,
wherein the control unit is configured to perform the steps of:
    a) controlling each of the drive motors subject to a predetermined vehicle speed such that an at least substantially equal basic drive torque is applied to each of the wheels, and
    b) for the purpose of changing an angular position of at least one wheel support arm relative to the chassis for changing the direction of the vehicle, controlling the drive motors associated with the at least one wheel support arm such that a steering torque which is of the same magnitude but of opposite direction is applied in addition to the basic drive torque to the wheels associated with the respective drive motors.

2. The vehicle according to claim 1, further comprising for at least one wheel a wheel rotation sensor connected to the control unit for measuring a rotation of the relevant wheel for determining an actual vehicle speed for the purpose of step a) while using the wheel rotation sensor.

3. The vehicle according to claim 1, further comprising for at least one of the first and the second wheel support arms a wheel rotation sensor connected to the control unit for each wheel associated with the wheel support arm for the purpose of measuring a rotation of the relevant wheel,
wherein the control unit is further configured, for the purpose of step a), to:
    a1) determine an actual speed of the wheel support arm at the position of the pivot axis thereof by determining an average from output signals coming from the two wheel rotation sensors associated with the wheels associated with the wheel support arm, and
    a2) determine an actual vehicle speed on the basis of the actual speed of the wheel support arm and to compare the actual vehicle speed to a predetermined vehicle speed so as to determine a speed deviation, and to change the basic drive torque of each of the wheels of the vehicle in equal measure depending on the speed deviation.

4. The vehicle according to claim 3, comprising for both the first and the second wheel support arms a wheel rotation sensor connected to the control unit for each wheel associated with the respective wheel support arm for the purpose of measuring a rotation of the relevant wheel, wherein the control unit is further configured, for the purpose of step a1), to:

determine an actual speed of both the first wheel support arm and the second wheel support arm, wherein during step a2) the actual vehicle speed is determined by determining an average of the actual speed of the first and the second wheel support arms.

5. The vehicle according to claim 1, comprising for at least one of the first and the second wheel support arms a rotation sensor connected to the control unit for determining a rotation of the relevant wheel support arm around the associated pivot axis relative to the chassis, wherein the control unit is further configured, for the purpose of step b), to:

b1) determine an actual angular position of the at least one wheel support arm on the basis of an output signal from the rotation sensor associated with the wheel support arm, and b2) compare the actual angular position to a predetermined angular position of the relevant wheel support arm so as to determine an angular position deviation and, depending on the angular position deviation, to change in equal measure but in opposing direction the additional steering torque applied to the wheels associated with the relevant wheel support arm.

6. The vehicle according to claim 5, comprising a first rotation sensor connected to the control unit for determining a rotation of the first wheel support arm around the first pivot axis relative to the chassis, a second rotation sensor connected to the control unit for determining a rotation of the second wheel support arm around the second pivot axis relative to the chassis.

7. The vehicle according to claim 6, wherein the control unit is further configured, for the purpose of step b2), to determine a predetermined angular position of the first wheel support arm and of the second wheel support arm on the basis of a predetermined change to be made in the direction of the vehicle such that the respective angular positions are at least substantially the same but in opposed directions.

8. The vehicle according to claim 1, wherein the second pivot axis is located at a fixed distance from the first pivot axis.

9. A method for moving an automatically controllable vehicle according to claim 1, comprising of performing the steps with the control unit of:

a) controlling each of the drive motors subject to a predetermined vehicle speed such that an at least substantially equal basic drive torque is applied to each of the wheels, and b) for the purpose of changing an angular position of at least one wheel support arm relative to the chassis for changing the direction of the vehicle, controlling the drive motors associated with the at least one wheel support arm such that a steering torque which is of the same magnitude but of opposite direction is applied in addition to the basic drive torque to the wheels associated with the respective drive motors.

10. A transport system for objects comprising a number of vehicles according to claim 1, and a central control unit for controlling each of the vehicles such that an object can be transported with a vehicle from a first location to a second location at a distance therefrom.

* * * * *